J. F. STEWARD.
Revolving Stereoscope.
No. 163,613.  Patented May 25, 1875.
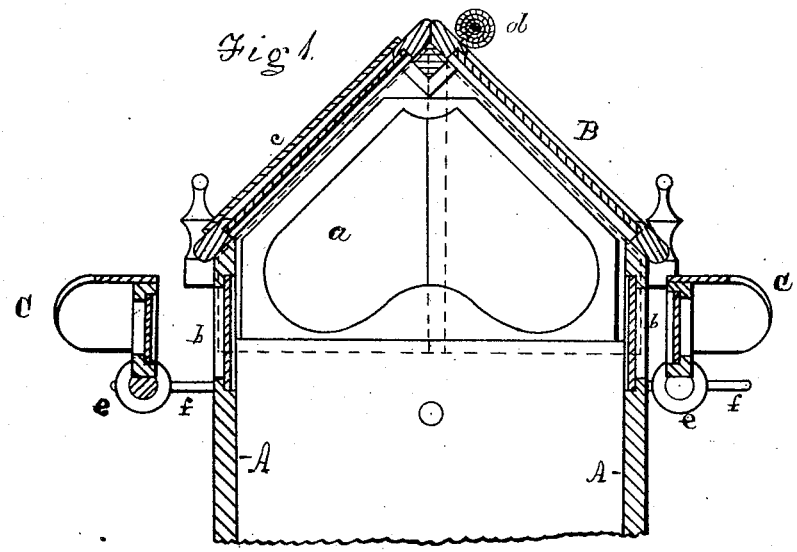
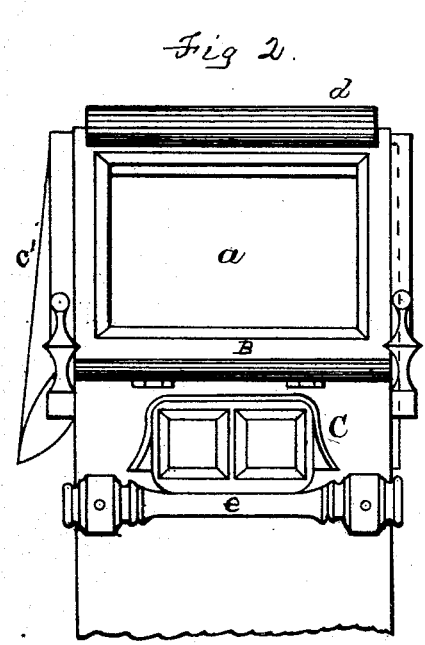
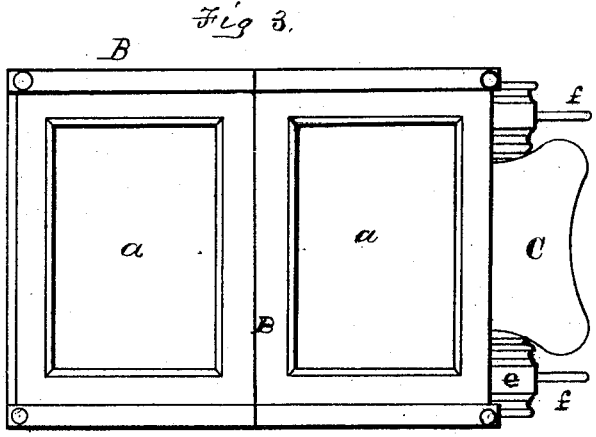
Witnesses:  
C. A. West  
A. W. Bond
John F. Steward  
Inventor
THE GRAPHIC CO. PHOTO-LITH. 39 & 41 PARK PLACE, N.Y.

UNITED STATES PATENT OFFICE.

JOHN F. STEWARD, OF PLANO, ILLINOIS.

IMPROVEMENT IN REVOLVING STEREOSCOPES.

Specification forming part of Letters Patent No. 163,613, dated May 25, 1875; application filed July 13, 1874.

*To all whom it may concern:*

Be it known that I, JOHN F. STEWARD, of Plano, in the county of Kendall, State of Illinois, have invented new and useful Improvements in Revolving Stereoscopes, of which the following is a full description, reference being had to the accompanying drawings, in which—

Figure 1 is a vertical section; Fig. 2, a front view; Fig. 3, a top view.

My invention consists in constructing the upper portion of the stereoscope mostly of glass, so that light can be admitted in all directions; in providing means for covering the glass in the top and sides, so as to prevent the admission of light except upon the back of transparent pictures, which is desirable to give the best effect to such transparent views, and in so connecting the eye-glasses with the case that they can not only be easily adjusted, but can also be easily removed from one side to allow the light to fall without obstruction upon the backs of transparent views. By means of the curtains the light can be controlled, while the ordinary opaque views are being examined, as circumstances may require, as well as entirely cut off from the top and sides, as before stated.

In the drawings, A represents the walls of an ordinary revolving stereoscope. B is the wood portion of the top, forming a frame, in which glass is set. The upper portion of the two sides and the top are provided with glass $a$, for the admission of light upon the views. The upper part of each front is made of glass $b$, as usual. The top has two curtains, one of which is shown down, $c$; the other, $d$, is rolled up. I also provide curtains to cover the glasses in the sides, one of which is shown at $c'$ in Fig. 2, while that on the opposite side is indicated by the dotted line in same figure. The dotted lines in Fig. 1 also indicate the curtains on one side. C are the eye-glasses, which are permanently secured to a cross-bar, $e$. Each end of this bar $e$ is provided with a hole, corresponding in position with pins $f$, which are secured to and project from the case. Upon the pins $f$ the bar $e$, with its glasses, is placed, the pins passing through the holes in $e$.

This construction enables the party using the instrument to adjust the glasses upon the pins to obtain the proper focus, as well as to quickly remove the glasses from either side when transparencies are to be examined.

The views are to be placed in a revolving holder, as usual, which is not shown in the drawings.

In use, when opaque views are to be examined, the curtains can all, or any suitable portion of them, be rolled up or drawn aside, admitting light into the case from both sides and from the top.

When transparencies are to be examined the curtains must all be down, excluding the light from the sides and top. The eye-glasses must be removed from one side, and the light admitted upon the back of the transparency through $b$, which is to be of such size that the light passing through it will none of it come to the eye by passing outside of the edges of the transparency, which is essential to the production of the best effects with this class of views.

If the light be permitted to fall upon the face of the view, or if a portion of the light comes directly to the eye, the best effects produced by the colors and their various shades cannot be obtained.

I do not confine myself to the exact devices shown and described for shutting out the light from the top and sides.

What I claim as new, and desire to secure by Letters Patent, is as follows:

1. The case A B, the part B being in angular form, and the glass $a$ in sides and top, in combination with eye-glass C, bar $e$, and pins $f$, substantially as and for the purpose specified.

2. The device herein described, consisting essentially of the parts A B, glass $a$ in sides and top, curtains $c$, $c'$, and $d$, and the eye-glass C, all combined as and for the purpose herein described.

JOHN F. STEWARD.

Witnesses:
 E. A. WEST,
 O. W. BOND.